United States Patent
Farrell et al.

(10) Patent No.: US 10,664,256 B2
(45) Date of Patent: May 26, 2020

(54) REDUCING OVERHEAD OF SOFTWARE DEPLOYMENT BASED ON EXISTING DEPLOYMENT OCCURRENCES

(71) Applicant: Microsoft Technology Licensing, LLC, Redmond, WA (US)

(72) Inventors: Terry Farrell, Dublin (IE); Darren Doyle, Witklow (IE); David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/017,990

(22) Filed: Jun. 25, 2018

(65) Prior Publication Data

US 2019/0391798 A1 Dec. 26, 2019

(51) Int. Cl.
*G06F 9/44* (2018.01)
*G06F 8/60* (2018.01)
*G06F 11/36* (2006.01)

(52) U.S. Cl.
CPC ............ *G06F 8/60* (2013.01); *G06F 11/3672* (2013.01)

(58) Field of Classification Search
CPC .... G06F 9/44505; G06F 8/60; G06F 11/3672; G06F 11/3409; G06F 11/302; G06F 8/65
See application file for complete search history.

(56) References Cited

U.S. PATENT DOCUMENTS

| | | | |
|---|---|---|---|
| 7,490,073 | B1 | 2/2009 | Qureshi et al. |
| 8,813,063 | B2 | 8/2014 | Uthe |
| 9,176,728 | B1 | 11/2015 | Dixit et al. |
| 9,612,821 | B2 | 4/2017 | Iyer et al. |

(Continued)

FOREIGN PATENT DOCUMENTS

WO 2017019684 A1 2/2017

OTHER PUBLICATIONS

Horton, Megan, "Why You Need Deployment Tracking in Retrace!", Retrieved from https://stackify.com/deployment-tracking/?gclid=Cj0KCQjw_ODWBRCTARIsAE2_EvWXOIjKCJ8Bk7yLIPCY2IM3vX1KFUcgKNv5tNBzbowBJrtl0UUPEgaAikwEALw_wcB, Sep. 29, 2017, 9 Pages.

(Continued)

*Primary Examiner* — Adam Lee
(74) *Attorney, Agent, or Firm* — Michael Best & Friedrich LLP

(57) ABSTRACT

Methods and systems for deploying software applications based on previous deployments. One method includes collecting first telemetry data tracking usage of a first plurality of features of a first software application by a first plurality of devices and creating a first plurality of mappings based on the first telemetry data. The method further includes, as part of deploying the first software application within an organization, collecting second telemetry data tracking usage of a second plurality of features of a second software application by a second plurality of devices of the organization, creating a second plurality of mappings based on the second telemetry data, determining a set of features to be included in a testing plan relating to the first software application based on the first plurality of mappings and the second plurality of mappings, and implementing the testing plan as part of deploying the first software application within the organization.

19 Claims, 4 Drawing Sheets

(56) References Cited

U.S. PATENT DOCUMENTS

| | | | |
|---|---|---|---|
| 2003/0014735 A1* | 1/2003 | Achlioptas | G06F 11/3688 717/125 |
| 2010/0274520 A1* | 10/2010 | Ur | G06F 11/3676 702/123 |
| 2011/0296371 A1* | 12/2011 | Marella | G06F 11/3688 717/101 |
| 2011/0320236 A1 | 12/2011 | Altuwaijri et al. | |
| 2012/0092379 A1* | 4/2012 | Tsuji | G06Q 10/10 345/660 |
| 2013/0159326 A1 | 6/2013 | Kyomasu et al. | |
| 2014/0012797 A1 | 1/2014 | Rao et al. | |
| 2015/0100684 A1 | 4/2015 | Maes et al. | |
| 2015/0120932 A1* | 4/2015 | Vissamsetti | H04L 47/70 709/226 |
| 2016/0203005 A1* | 7/2016 | Balasubramanian | G06F 16/248 707/722 |
| 2016/0210224 A1* | 7/2016 | Cohen | G06F 9/44589 |
| 2016/0234087 A1* | 8/2016 | Nyerges | H04L 45/02 |
| 2016/0255113 A1 | 9/2016 | Efstathopoulos | |
| 2018/0011697 A1* | 1/2018 | Berkebile | G06F 8/60 |
| 2018/0083841 A1 | 3/2018 | Mutreja et al. | |
| 2018/0293158 A1* | 10/2018 | Baughman | G06F 11/3692 |

OTHER PUBLICATIONS

"Insights in Windows Upgrade Analytics accelerate Windows 10 upgrades", Retrieved from: https://query.prod.cms.rt.microsoft.com/cms/api/am/binary/RWrwZZ, Dec. 20, 2016, 6 Pages.

Lindsay, et al., "Upgrade Readiness—Step 1: Identify important apps", Retrieved from: http://web.archive.org/web/20180302010217/https://docs.microsoft.com/en-us/windows/deployment/upgrade/upgrade-readiness-identify-apps, Apr. 19, 2017, 3 Pages.

Lindsay, et al., "Upgrade Readiness—Step 2: Resolve app and driver issues", Retrieved from: http://web.archive.org/web/20180302010218/https://docs.microsoft.com/en-us/windows/deployment/upgrade/upgrade-readiness-resolve-issues, Aug. 31, 2017, 18 Pages.

Lindsay, et al., "Upgrade Readiness—Step 3: Deploy Windows", Retrieved from: http://web.archive.org/web/20180302010218/https://docs.microsoft.com/en-us/windows/deployment/upgrade/upgrade-readiness-deploy-windows, Apr. 19, 2017, 5 Pages.

"International Search Report and Written Opinion Issued in PCT Application No. PCT/US2019/036213", dated Sep. 23, 2019, 12 Pages.

* cited by examiner

REDUCING OVERHEAD OF SOFTWARE DEPLOYMENT BASED ON EXISTING DEPLOYMENT OCCURRENCES

FIELD

Embodiments described herein relate to crowdsourcing reliability and usability of software products within an organizational context. For example, some embodiments provide methods and systems for developing a testing plan for a software deployment within an organization by leveraging results of deployments by other organizations.

SUMMARY

Deploying a software product within an organization is a large project that includes multiple stages including, for example, an assess stage, a test stage, a pilot stage, and a deploy stage. This deployment process requires significant time and resources on a frequent basis, especially for a software deployment providing new features, such as deployments of new versions of existing software products. For example, during the assess stage, the information technology (IT) department of an organization may spend significant time and resources assessing the hardware used by the organization against the new software. The IT department may also assess existing solutions built on the software product to ensure these solutions continue to work after the deployment and determine how the software deployment may affect productivity, such as whether new software removes previously-used features or modifies previously-used features.

After the assess stage, the IT department tests assumptions determined during the assess stage by deploying the new software in various configurations and tracking the results of particular software features. After testing (and addressing any errors detected during the testing stage), the IT department begins a limited roll out of the software as a pilot to provide further testing of the software prior to full deployment. Once the pilot is considered successful, the large roll out may begin.

As software providers deliver updates quicker and quicker, this process can overwhelm organizations in terms of manpower required and costs. Accordingly, embodiments described herein provide systems and methods that use crowdsourced data from previous deployments to automatically provide relevant data before an organization embarks on a new deployment. In other words, the systems and methods described herein shorten the deployment process by using the results of testing software performed by other organizations to focus testing performed by an organization on edge cases potentially missed by other organizations, tested features having poor success rates for other organizations, features not tested by other organizations that may be specific to the organization, or a combination thereof. The testing results may also be grouped by organization parameters such as type of industry or other parameters (company size, company demographic, distribution of user types (job roles or titles, activities, departments), company geographic locations, or the like) to provide relevant testing results to an organization. All of the crowdsourced testing results shared with the organization are provided without compromising the security or privacy of the other organizations.

In some embodiments, in addition to or as an alternative to identifying software features that have been previously deployed successfully and, therefore, may not need further testing, the methods and systems described herein may automatically forecast resources needed by an organization to execute the testing plan as well as testing configurations that may be needed. Again, the systems and methods may leverage testing results from other organizations to provide these estimates and configurations.

As also described herein, the crowdsourced data used to reduce resources needed during a software deployment may also be provided to a software developer as feedback regarding what features of a software product have been tested and the results of such testing. The feedback may be provided in various statistics including, for example, number of deployments, types of organizations deploying the software, features tested during deployments and the results of such testing, hardware configurations used in deployments, software configurations used in deployments, or a combination thereof. The software developer may use this feedback to identify potential bugs in the software, identify features that are commonly used and, hence, tested during deployment, identify features that may need updates to make the features easier to deploy or compatible with particular hardware or software configurations, or a combination thereof. The software developer may also use this information as marketing data, such as by alerting potential purchasers of the software that the software has been successfully deployed by a certain number of organizations, a certain type of organization (for example, an organization within a particular industry), has been successfully deployed for particular uses, particular hardware configurations, or the like.

For example, one embodiment provides a system for deploying software applications based on previous software deployments. The system includes at least one electronic processor configured to collect first telemetry data from a first plurality of devices. The first telemetry data includes usage of a first plurality of features of a first software application by the first plurality of devices. The at least one electronic processor is also configured to create, based on the first telemetry data, a first plurality of mappings and determine a level of deployment success for each of the first plurality of mappings. Each of the first plurality of mappings represents a profile of one of the first plurality of devices, the first software application, and usage of one of the first plurality of features by the one of the first plurality of devices. The at least one electronic processor is also configured to, as part of deploying the first software application within an organization, collect second telemetry data from a second plurality of devices associated with the organization and create, based on the second telemetry data, a second plurality of mappings. The second telemetry data includes usage of a second plurality of features of a second software application by the second plurality of devices, and each of the second plurality of mappings representing a profile of one of the second plurality of devices, the second software application, and usage of one of the second plurality of features by the one of the second plurality of devices. The at least one electronic processor is further configured to compare the first plurality of mappings and the second plurality of mappings to determine a set of features to be included in a testing plan for the organization relating to the first software, and implement the test plan as part of deploying the first software application within the organization.

Another embodiment provides a method for deploying software applications based on previous software deployments. The method includes collecting, with an electronic processor, first telemetry data from a first plurality of devices, the first telemetry data including usage of a first plurality of features of a first software application by the first plurality of devices, and creating, based on the first telemetry data, a first plurality of mappings. Each of the first plurality of mappings represents a profile of one of the first plurality of devices, the first software application, and usage of one of the first plurality of features by the one of the first plurality of devices. The method also includes determining a level of deployment success for each of the first plurality of mappings. In addition, the method includes, as part of deploying the first software application within an organization, collecting, with the electronic processor, second telemetry data from a second plurality of devices associated with the organization and creating, based on the second telemetry data, a second plurality of mappings. The second telemetry data includes usage of a second plurality of features of a second software application by the second plurality of devices, and each of the second plurality of mappings representing a profile of one of the second plurality of devices, the second software application, and usage of one of the second plurality of features by the one of the second plurality of devices. The method further includes determining a set of features to be included in a testing plan for the organization relating to the first software application based on the first plurality of mappings and the second plurality of mappings, and implementing the testing plan as part of deploying the first software application within the organization.

Yet another embodiment provides a non-transitory computer-readable medium storing instructions that, when executed with an electronic processor, perform a set of functions. The set of functions includes collecting first telemetry data from a first plurality of devices, wherein the first telemetry data including usage of a first plurality of features of a first software application by the first plurality of devices, and creating, based on the first telemetry data, a first plurality of mappings. Each of the first plurality of mappings representing a profile of one of the first plurality of devices, the first software application, and usage of one of the first plurality of features by the one of the first plurality of devices. The set of functions also includes, as part of deploying the first software application within an organization, collecting second telemetry data from a second plurality of devices associated with the organization, the second telemetry data including usage of a second plurality of features of a second software application by the second plurality of devices, creating, based on the second telemetry data, a second plurality of mappings, determining a set of features to be included in a testing plan for the organization relating to the first software application based on the first plurality of mappings and the second plurality of mappings, and implementing the testing plan as part of deploying the first software application within the organization. Each of the second plurality of mappings represents a profile of one of the second plurality of devices, the second software application, and usage of one of the second plurality of features by the one of the second plurality of devices.

DETAILED DESCRIPTION

Figure 1:
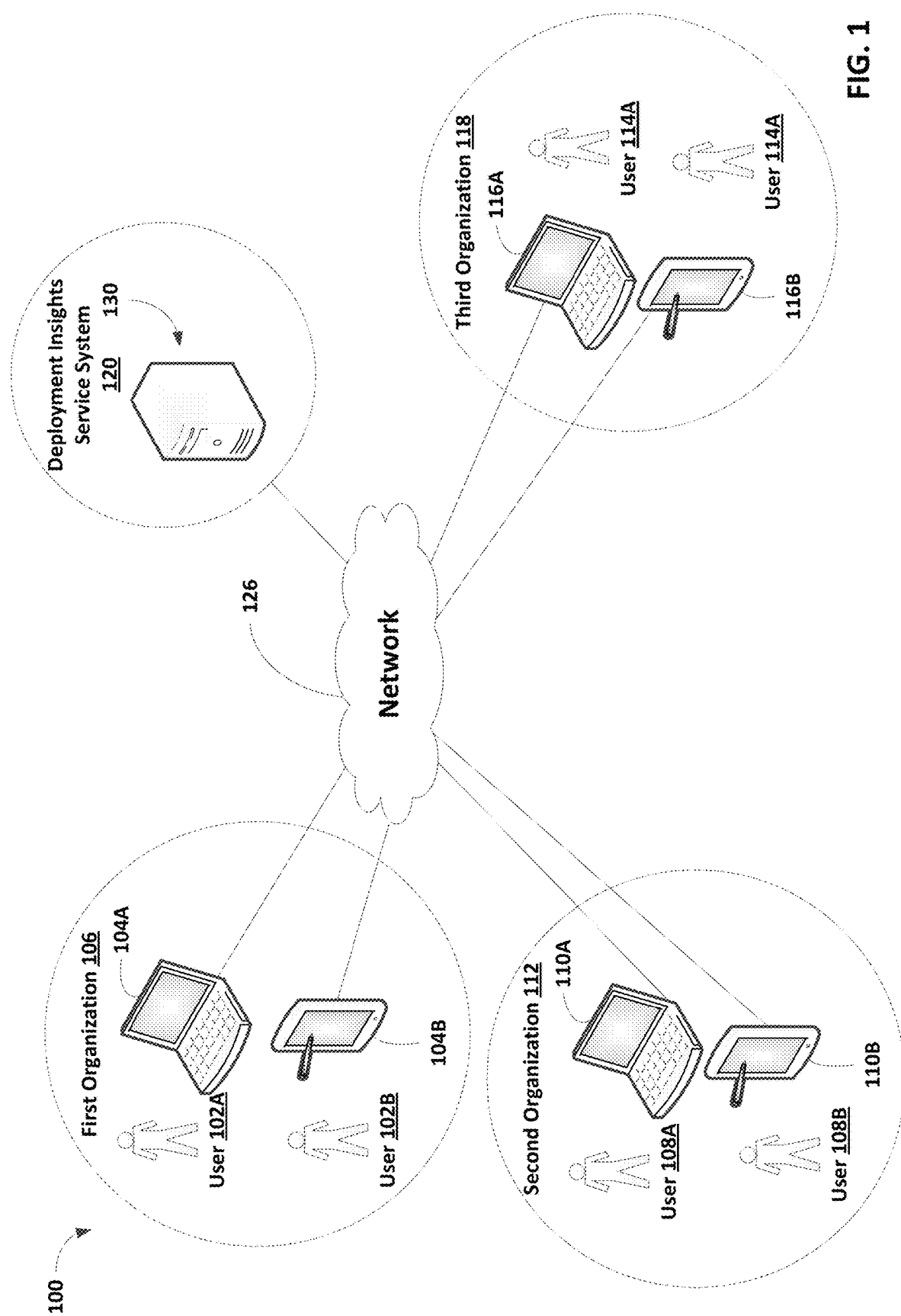
FIG. 1 schematically illustrates an environment for providing deployment services according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, the software deployment process is a time-consuming process that requires significant manpower as well as computing resources. To reduce the overhead associated with this process, embodiments described herein use the collective deployment results of a plurality of organizations for a particular software product to aid an organization seeking to deploy the software product (the "deploying organization") in developing a testing and deployment plan. In particular, the methods and systems described herein collect a variety of usage signals from organizations that have evaluated and delivered a software product combined with hardware and software configurations of the organizations to create unique assessments that indicate the delta level of work required to safely push out the software deployment for a particular organization. For example, the systems and methods described herein may collect telemetry from a plurality of organizations indicating that a particular hardware and software configuration (for example, a Dell XPS15 running Windows 10 and Office 2016) have been deployed by 100 organizations. The collected telemetry data may also indicate that these 100 organizations use 90% of the features that the deploying organization uses. Therefore, the systems and methods described herein can automatically determine that the deploying organization should focus their testing on the delta features (the difference between the features tested by the other organizations and the features used by the deployment organization). In some embodiments, the systems and methods can also estimate the resources needed to perform this testing of the delta features. Again, this estimation may be based on the telemetry data collected for the other organizations.

For example, FIG. 1 illustrates an example environment 100 for deploying software products based on previous software deployments. It should be understood that the deployment of a software product may include the deployment of a completely new software product or application to an organization or the deployment of an upgrade or new version of an existing software product or application used by the organization. In the environment 100, a first user 102A and a second user 102B (collectively "users 102") represent a plurality of users 102 that use respective computing devices 104A and 104B (collectively "computing devices 104") that are associated with a first organization 106. A third user 108A and a fourth user 108B (collectively "users 108") represent a plurality of users 108 that use respective computing devices 110A and 110B (collectively "computing devices 110") that are associated with a second organization 112. A fourth user 114A and a fifth user 114B (collectively "users 114") represent a plurality of users 114 that use respective computing devices 116A and 116B (collectively "computing devices 116") that are associated with a third organization 118. It should be understood that the environment 100 may include additional organizations and each organization may include computing devices, users, or both in addition to those illustrated in FIG. 1.

As illustrated in FIG. 1, the computing devices 104, 110, and 116 of the organizations 106, 112, and 118 communicate with a deployment insights service system 120 over a network 126. The network 126 includes one or more wired networks, wireless networks, or a combination thereof that enable communications within the environment 100. For example, in some configurations, the network 126 includes cable networks, the Internet, local area networks (LANs), wide area networks (WAN), mobile telephone networks (MTNs), and other types of networks, possibly used in conjunction with one another, to facilitate communication between the servers and the computing devices included in the environment 100.

As illustrated in FIG. 1, the deployment insights service system 120 includes a server 130. It should be understood that the functionality described herein as being performed by the deployment insights service system 120 may be distributed among multiple servers including within a cloud environment. The deployment insights service system 120 may also include additional components and may provide additional functionality than the functionality described herein. For example, in some embodiments, the deployment insights service system 120 is provided as part of an online service environment that the first organization 106, second organization 112, and third organization 118 are tenants of. It should also be understood that the environment 100 may include additional components than those illustrated in FIG. 1 in various configurations. For example, the computing devices 104, 110, and 116 (or a subset thereof) may communicate with the deployment insights service system 120 through one or more intermediary devices including for example, firewalls, gateways, routers, databases, and the like. As described in more detail below, the deployment insights service system 120 receives telemetry data from the computing devices 104, 110, and 116 of the plurality of organizations 106, 112, and 118 and uses this information to provide deployment services, including automatic customization of a testing plan for a particular organization.

Figure 2:
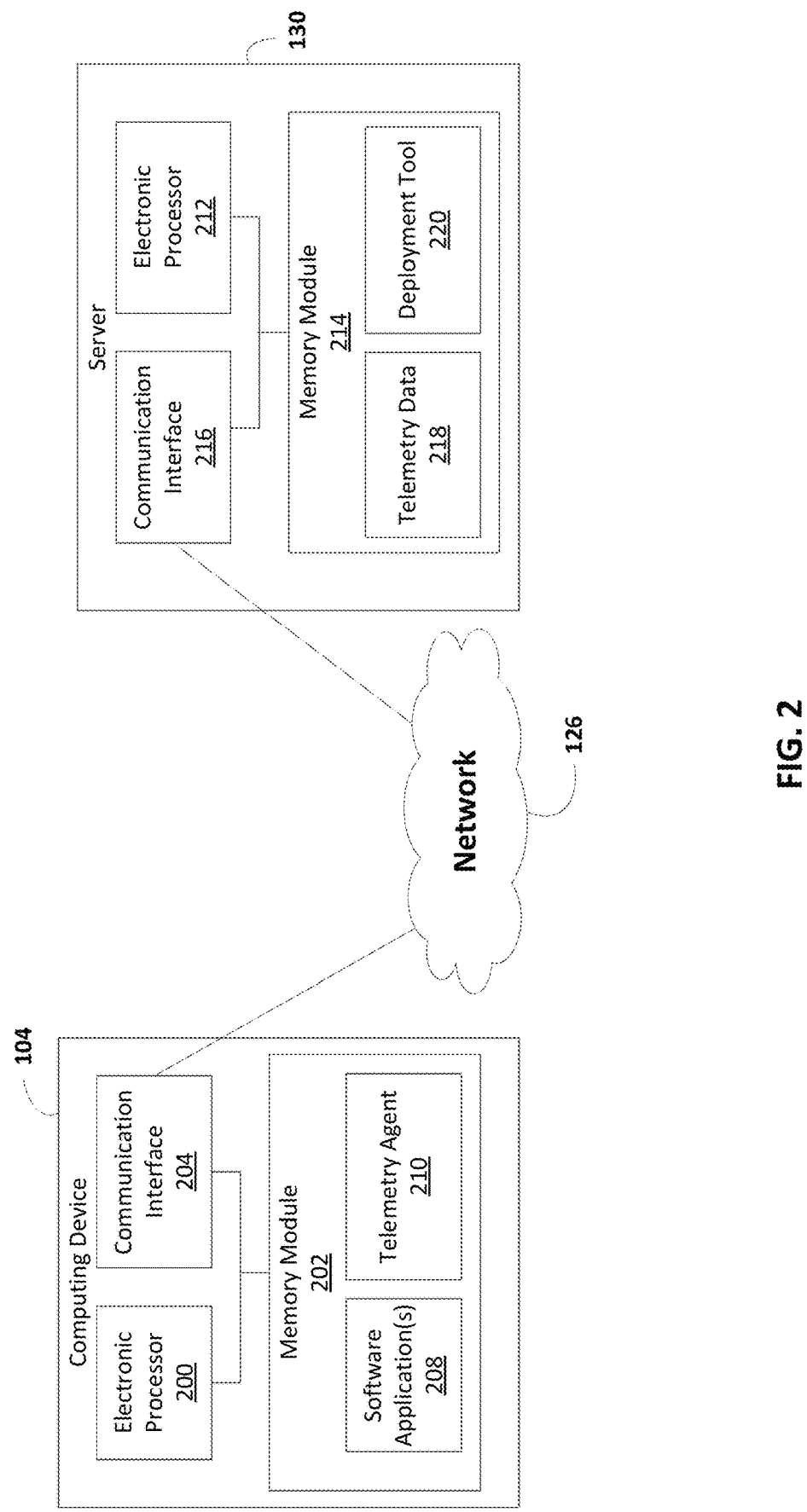
FIG. 2 schematically illustrates components included in the environment of FIG. 1 according to some embodiments.

The computing devices 104, 110, and 116 can be implemented as any number and configuration of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (for example, a smart watch, electronic "smart" glasses, a fitness tracker, or the like), or any other electronic device that can transmit and receive data over one or more networks. For example, as illustrated in FIG. 2, a computing device 104 can include an electronic processor 200, a computer-readable memory module 202, and a communication interface 204. For the sake of simplicity and clarity FIG. 2 illustrates a single computing device 104 associated with the first organization 106. However, it should be understood that the other computing devices included in the environment 100 may include similar components configured to perform similar functionality as described herein with respect to the computing device 104.

The memory module 202 included in the computing device 104 can include non-transitory memory, such as random access memory, read-only memory, or a combination thereof. The electronic processor 200 can include a microprocessor configured to execute instructions stored in the memory module 202. The memory module 202 can also store data used with and generated by execution of the instructions. The communication interface 204 allows the computing device 104 to communicate with external networks and devices, including the network 126. For example, the communication interface 204 may include a wireless transceiver for communicating with the network 126. It should be understood that the computing device 104 may include additional components than those listed in FIG. 2 in various configurations. For example, in some embodiments, a computing device 104 included in the first organization 106 includes a plurality of electronic processors, memory modules, communication interfaces, or a combination thereof.

As illustrated in FIG. 2, the memory module 202 included in the computing device 104 may store one or more software applications 208. The software applications 208 are executed by the electronic processor 200 to provide various computing tools and technology to a user, such as productivity tools, financial tools, human resources tools, product development tools, and the like. In some embodiments, one or more of the software applications 208 are web-based applications that allow a user of the computing device 104 to access computing tools and technology over a network. For example, the software applications 208 may include a browser application or a dedicated application for accessing a web-based application over a network.

As illustrated in FIG. 2, the memory module 202 also includes a telemetry agent 210. The telemetry agent 210 (as executed by the electronic processor 200 included in a computing device 104) is installed and run locally on computing devices to collect telemetry data relating to the software, hardware, or both installed and used via a particular computing device. For example, the telemetry agent 210 may be configured to collect telemetry data associated with the use (including testing) of a software application 208 executed by the electronic processor 200. The telemetry agent 210 is configured to transmit the collected telemetry data to the server 130 included in the deployment insights service system 120.

In some embodiments, the telemetry data transmitted by the telemetry agent 210 includes hardware information, software information, or a combination thereof of the computing device 104. For example, the telemetry data may include hardware attributes, such as, for example, an organization identifier, a user identifier, a machine access control (MAC) address, build, makes, or models of the computing device 104, the electronic processor 200, the memory module 202, the communication interface 204, or other hardware components of the computing device 104, or a combination thereof.

In some embodiments, the telemetry data may be used to classify a user (define a user type). For example, the telemetry data may include attributes of a user, such as job title, department size, or the like. Alternatively or in addition, the telemetry data may include data, such as a user identifier, that can be used to pull this information from other sources, such as employment directory or organizational chart or information. For example, in some embodiments, a user identifier included in collected telemetry data may be used to access information about the user, such as job function or title (accountant, salesperson, or the like), from one or more social networks, such as Facebook, LinkedIn, or the like. Furthermore, the telemetry data may be used to classify users based on their activities, such as what text (keywords) they type, what templates they open or use, their privacy settings, or the like. Alternatively or in addition, an administrator may provide attributes for users, including job titles, functions, or the like or feed this data from a human resources (HR) system. Also, in some embodiments, analysis tools, such as statistical analysis, could be used to translate collected telemetry data for a user (click data, text entered, options selected, or the like) to assign a job title probabilistically. As described in more detail below, classifying users into user types may be used to identify similarly-situated organizations or users to provide more tailored insights to an organization considering a particular software deployment. For example, similarly-situated organizations may be identified based on organizations that have a similar distribution of user types (job roles or titles, activities, departments) as the organization performing the deployment.

Additionally or alternatively, the telemetry data may include software attributes such as installed drivers and version numbers, installed software applications and associated version numbers, version information for an operating system installed on the device, usage of the software applications, and performance of such software applications, including but not limited to a number of sessions, a number of crashes, features used, extensions or add-ins used, in-app purchases, and the like. The software attributes may also include configurations or other settings for a software application 208.

The telemetry agent 210 associated with the computing device 104 may be configured transmit collected telemetry data periodically, in response to events or rules, or a combination thereof. For example, the telemetry agent 210 may be configured to transmit collected telemetry data at a predetermined frequency (for example, every 5, 10, or 15 minutes or at any suitable time interval). As another example, the telemetry agent 210 may be configured to apply one or more rules to determine when collected telemetry data should be transmitted, such as in response to an event. An event may include an error event (a software failure). Alternatively or in addition, the server 130 included in the deployment insights service system 120 may be configured to request telemetry data from the telemetry agent 210 on a predetermined frequency, in response to a detected event (including receipt of user input requesting a software development recommendation), or the like. For example, as the collected telemetry data may have multiple uses separate from determining software deployment recommendations, the telemetry agent 210 may be configured to store collected telemetry data in one or more local data repositories (databases), and the deployment insights service system 120 may be configured to access these repositories and retrieve needed data to perform a software deployment recommendation as applicable. Alternatively, the telemetry agent 210 (or the local data repositories) may be configured transmit telemetry data from the local data repositories to the deployment insights service system 120 as described above.

In some embodiments, the telemetry agent 210 is configured to clean or anonymize collected telemetry data before transmission. For example, the telemetry agent 210 may be configured to remove or modify data included in the collected telemetry data that could be used to identify a particular user or a particular organization associated with the user, such as by removing usernames or identifiers, removing device names or identifiers, and the like. In some embodiments, the deployment insights service system 120 (or one or more intermediary devices) may be configured to perform this cleaning upon receipt of transmitted telemetry data from the telemetry agent 210 as an alternative to or in addition to the telemetry agent 210. Also, it should be understood that the telemetry agent 210 may be configured to remove identifying information from the telemetry data by removing a name or recognizable identifier of an organization, computing device, or user but may include an identifier (such as a randomly assigned identifier provided by the deployment insights service system 120) that associates the transmitted telemetry data to a particular organization profile, which may include one or more organization parameters. In other embodiments, the deployment insights service system 120 may be configured to automatically identify an organization associated with transmitted data based on, for example, an Internet protocol (IP) address that the telemetry data is received from. As described in more detail below, the deployment insights service system 120 uses the fact that particular telemetry data was received from an organization with a particular profile to group telemetry data by industry, organization size, distribution of user types (job roles or titles, activities, departments), organization demographic, or other organization parameter. The deployment insights service system 120 may infer the organization parameters from the received data or through settings provided by an organization during a configuration process for the deployment insights service system 120.

As illustrated in FIG. 2, the server 130 included in the deployment insights service system 120 can include an electronic processor 212, a computer-readable memory module 214, and a communication interface 216 similar to the electronic processor 200, the memory module 202, and the communication interface 204 as described above with respect to the computing device 104. It should be understood that the server 130 may also include additional components than those illustrated in FIG. 2 in various configurations. Also, as noted above, the functionality described herein as being performed by the server 130 may be distributed over multiple servers or devices.

As illustrated in FIG. 2, the memory module 214 included in the server 130 may store telemetry data 218 received from one or more of the organizations (for example, the telemetry data received from the computing device 104 included in the first organization). As noted above, the telemetry data 218 collected by the deployment insights service system 120 may be associated with a particular organization (or particular organization profile). For example, the server 130 may be configured to store received telemetry data with an organization identifier, which may be used to link the telemetry data to a particular organization or group of organizations by industry, size, demographic, or the like. For example, in some embodiments, a randomly-assigned identifier for an organization may be associated with all telemetry data received from the organization and this identifier can be used to look up parameters of the organization (for example, stored in a database), such as name (optional), industry, size, demographics, or the like. These organization parameters may be inferred from the collected telemetry data or provided separately by an organization, such as during a set up or configuration process for using the deployment insights service system 120. For example, an organization may be asked to provide their industry, size, demographic, geographic locations, or the like when agreeing to participate in the deployment insights service system 120.

As illustrated in FIG. 2, the memory module 214 included in the server 130 also includes a deployment tool 220. The deployment tool 220, as executed by the electronic processor 212, processes telemetry data collected by one or more telemetry agents associated with one or more organizations to generate a software deployment recommendation for a particular organization. Accordingly, the deployment tool 220 can use existing telemetry data from a plurality of organizations to generate an accurate and useful deployment recommendation that reduces the time and resources traditionally associated with software deployments. For example, the deployment tool 220 may automatically generate a testing plan for an organization. The testing plan may include a list of features in a software application that should be tested by the organization as part of deployment of a particular software product because the features have not been tested or adequately tested (per a level of risk or confidence set by the organization) by other organizations, including similarly-situated organization, such as, for example, organizations in the same industry. The testing plan generated by the deployment tool 220 may also include a list of recommend tests for testing the identified software features. The testing plan may also include a list of job titles or professions (user classification) for whom the software works well or doesn't work. In particular, as noted above, collected telemetry data may be used to classify users, which can be used to determine whether a particular software product works for particular types of users, such as users with particular job titles or functions. All of this functionality may be presented through one or more user interfaces (such as dashboards) to provide administrators with a consolidated portal for managing software deployment.

To provide one example, assume the IT department for a large financial organization may manage software deployments to approximately 100,000 computing devices owned or operated by the organization. In the past, such deployments were a monumental task as the entire set of device configurations for the organization required full regression testing against the new software product. This would generally require the creation of a deployment project, the hiring a team of testers, and a long window between the release of the software product and the software product actually getting installed for users in the organization to use. This was a costly and time intensive process that would sometimes force the organization to skip new versions of software to reduce the cost associated with ensuring that the new software is compatible within the organization's existing computing environment. Furthermore, as software updates are often released frequently, such as every few weeks, the demand for efficient software deployments becomes even more important.

Accordingly, in this example, the IT department can use the deployment tool 220 and the functionality described herein to use the collective wisdom of other similarly-situated companies to narrow down the scope of required testing, which allows the organization to push out software faster and more safely. For example, members of the IT department can log into a deployment dashboard to review new software releases (including new versions) and reports that aid the IT department in managing a deployment of a particular new software release. In particular, the reports can include target user groups created by the deployment tool 220 that may be able to receive a particular deployment with minimal or no testing (based on the deployment success of other organizations). Drilling into these reports, the IT department can learn what hardware configurations are used by the organization, what features are used by the organization, and the level of testing (including successful usage) that has been recorded for other organizations, including similarly-situated organizations, such as organizations also in the financial industry. The degree of similarity used to by the deployment insights service system 120 to group similarity-situated organizations may vary depending on the circumstances of the deployment. For example, in some situations, the organization may have never used the software before and so similarity may be deemed based on the overall organization's industry, or the relative distribution of people with various job titles. In other scenarios, where the organization has used a particular version of the software, the deployment insights service system 120 may use which features particular types of users have been used and what hardware has been used to determine similarly-situated organizations, and, hence provide accurate inputs so that the server 130 can generate a very accurate test plan. All of this information may allow the IT department to forego particular testing and move more quickly toward software deployment for the organization.

Similarly, based on the information provided in the report, the IT department may identify a set of users who have configurations that have not seen wide adoption or testing by other organizations. Drilling into this information, the IT department can see a set of device configurations that are not fully validated as tested. Furthermore, the reports may identify what features the organization has historically used for similar software (including, for example, previous versions of the new software release), which is determined based on the telemetry data collected from the organization.

In addition, the reports may specify what features the organization relies on that need to be validated as part of the deployment (because the features have not been adequately tested or successfully deployed by other organizations). The reports available through the user interface may also specify testing templates created based on device configurations and features users rely on to make sure the features needing validation are properly tested. This template provides a map for maximizing testing output with minimal required effort. The template may also be associated with an estimate of the testing workload, which may be broken down into man-hours. This information allows the IT department to accurately forecast costs if manpower is required for manual test passes. In some embodiments, the template is also customizable such that features can be removed or marked as already tested to ensure that the testing template is as accurate as possible.

For example, a test template may indicate that there are two features users rely on that need to be checked against the new software release. Accordingly, the IT department (after validating that the new software release works on a test configuration), can create (manually or automatically) a "pilot" of computing devices used by users who rely on one or both of these identified features to obtain real usage feedback. Once deployed to this pilot group, the deployment tool 220 collects telemetry data for the organization, which as described above, can be collected at a feature usage level. This collected data can be presented to the IT department within the user interfaces provided by the deployment tool 220. For example, in some embodiments, the user interfaces can report a confidence level for particular features for individual or groups of computing devices included in the pilot. For example, if the feature is an invoicing feature, then saving an invoice may generate a low confidence score, while printing an invoice may generate a medium score. The deployment insights service system 120 may also have logic to combine multiple instances of the same action (for example, printing 30 invoices) to give a very high confidence score. As these confidence levels reach a predetermined threshold (configurable by the IT department), the deployment tool 220 may automatically rollout the new software release to more users (devices). The deployment tool 220 may continue this rollout process (while allowing time between each new rollout for feedback to be received and analyzed) as long as each confidence level does not drop below a threshold value. These threshold values can also be automatically or manually adjusted based on changes to the confidence levels. For example, if the confidence level drops below a particular threshold, remains below a particular threshold for a predetermined period of time, or experiences a sudden drop over a predetermined period of time number, the deployment tool 220 may automatically adjust the threshold that controls expanded rollouts to limit the rollout process. Similarly, steady or high confidence levels may result in adjustments to the expanded rollout threshold to accelerate the rollout process.

In addition to aiding the organization in the deployment process, the collected telemetry data from the organization is used by the deployment tool 220 to enhance the reports and associated information provided to other organizations using the deployment tool 220 (such as similarly-situated organizations), which further reduces workload and testing costs for these organizations. In other words, the deployment tool 220 expands its knowledge over time through collection of telemetry data during software deployments (including deployments the tool 220 helped managed), which improves the performance of the deployment tool 220 over time.

Figure 3:
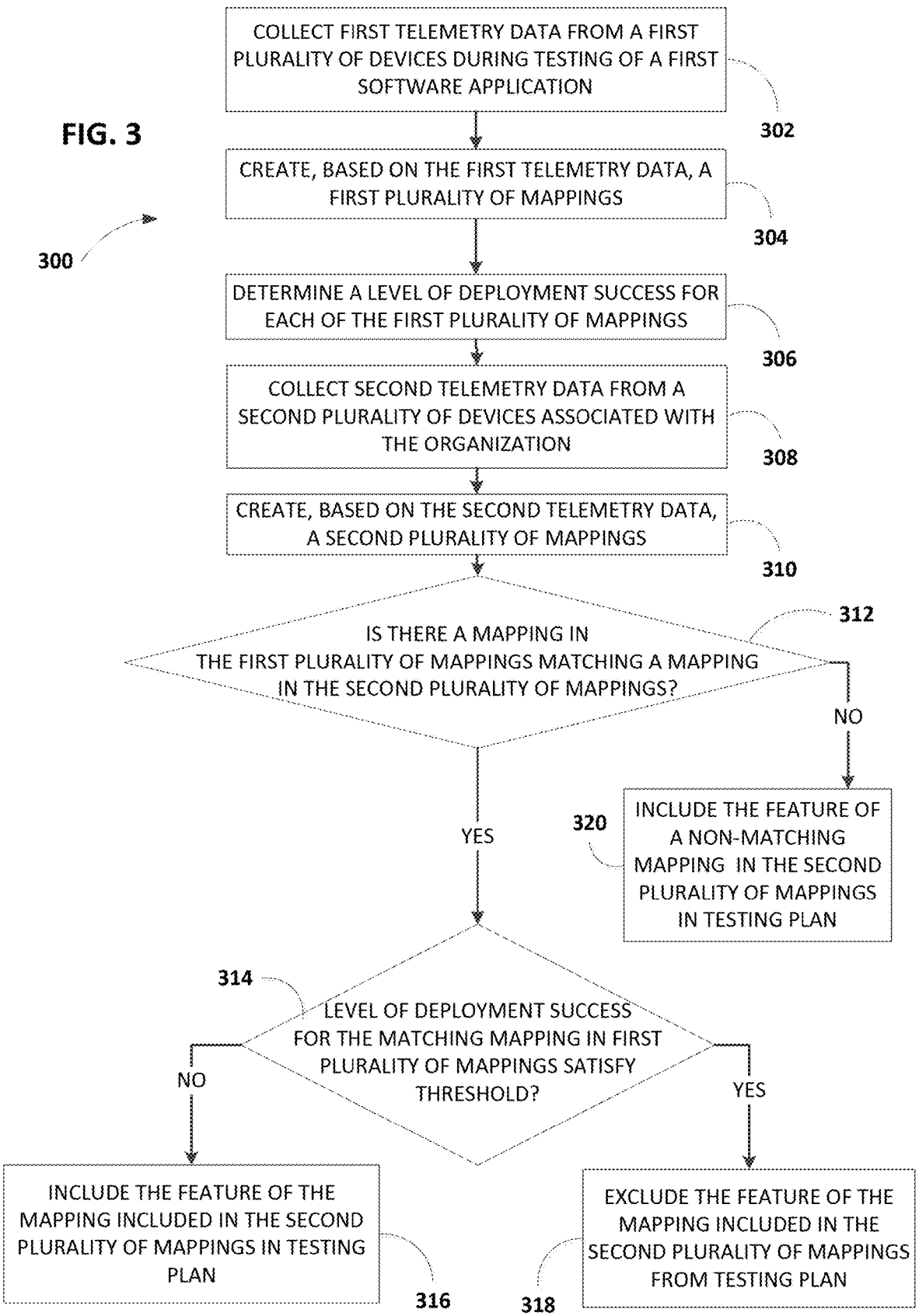
FIG. 3 is a flowchart illustrating a method for generating a test plan for deploying software applications based on previous software deployments performed by the environment of FIG. 1 according to some embodiments.

For example, FIG. 3 illustrates a method 300 for generating a test plan for deploying software applications based on previous software deployments according to one embodiment. The method 300 is described here as being performed the deployment tool 220 (as executed by the electronic processor 212). However, as noted above, this functionality may be performed through the execution of one or more software applications by one or more devices. For example, in some embodiments, the functionality or a portion thereof may be performed locally on a computing device of an organization.

As illustrated in FIG. 3, the method 300 includes collecting first telemetry data from a first plurality of computing devices during testing of a first software application (at block 302). The first plurality of computing devices may include computing devices from a single organization or multiple organizations that have a matching organization parameter (for example, belong to the same industry). For example, the first plurality of computing devices may include computing devices 104 and the computing devices 110 associated with the first organization 106 and the second organization 112, respectively. However, it should be understood that the collected telemetry data may be for a single organization or all organizations enrolled in the deployment insights service system 120 or otherwise having a local telemetry agent 210 as described above. Accordingly, the collected telemetry data may include a collection of all known configuration data across multiple organizations for the software application (or versions thereof).

The collected telemetry data includes usage of a first plurality of features of the first software application by the first plurality of computing devices. For example, the telemetry data may include data regarding a particular feature of the first software application (create pivot table, add underlining, add new employee record, or the like) used by a user of one of the first plurality of computing devices as well as any errors that occurred during such usage.

Based on the received telemetry data, the deployment tool 220 creates a first plurality of mappings (at block 304). Each mapping represents a profile or digital fingerprint of a computing device included in the first plurality of computing devices, the first software application, and usage of at least one feature of the first software application via the computing device. For example, a mapping may include a profile of a computing device (in terms of hardware, software, or a combination thereof), a user profile or classification (for example, accountant), an identifier of the software application (including an identifier of a specific version of the software application), and usage information of the software application. The deployment tool 220 may use various artificial intelligence (AI) algorithms to create these mappings.

For each mapping created for the first organization 106, the deployment tool 220 determines a level of deployment success (at block 306). In some embodiments, the level of deployment success may be represented by a numerical value between 0 and 100. For example, if a feature of a software application was successfully used on a computing device without error ninety-five percent of the time, the electronic processor 212 may determine a level of deployment success for a mapping associated with the feature and the computing device is ninety-five. It should be understood that other values or ranges may be used to specify the deployment success level. Again, the deployment tool 220 may use various AI and analysis techniques to determine the level of deployment success, such as by determining a number of errors or crashes experienced that may be related to the use of the feature associated with the mapping. The deployment tool 220 can append the level of deployment success to the associated mapping. As described in more detail below, the details of this mapping may be submitted to an on-line store providing software to provide insight to potential users of how easily or efficiently the software can be deployed in particular situations, organizations, or industries.

The deployment tool 220 uses these mappings to develop a testing plan for an organization for the first software application (for example, the third organization 118). This organization may be referred to in the present application as the "deploying organization." To develop this plan for the deploying organization, the deployment tool 220 collects second telemetry data from a second plurality of computing devices associated with the deploying organization (at block 308). The second telemetry data may include data regarding the usage of a second software application by the deploying organization, including what features of the second software application are used by the users of the deploying organization. When the first software application is a new version of a software product, the second software application may be a previous version of the same software product currently being used by the deploying organization. Alternatively, the second software application may be a different application than the first software application but may provide similar functionality. For example, the first software application may include accounting software provided by a first software vendor and the second software application may include accounting software provided by a second, different software vendor currently used by the deploying organization.

Using the collected second telemetry data, the deployment tool 220 creates a second plurality of mappings for the deploying organization (at block 310). The deployment tool 220 may create the second plurality of mappings similar to the first plurality of mappings as described above.

The deployment tool 220 compares the first plurality of mappings to the second plurality of mappings (at block 312). It should be understood that the deployment tool 220 may filter the first plurality of mappings before performing this comparison to compare the second plurality of mappings with mappings created for similarly-situated organizations. For example, the deployment tool 220 may be configured use telemetry data received from similarly-situated organizations (for example, organizations in a common industry) when generating the first plurality of mappings or when selecting mappings for comparison with the second plurality of mappings. In particular, when an organization in the banking industry is seeking assistance in deploying a particular software application, the deployment tool 220 may apply one or more rules to identify similarly-situated organizations and limit the telemetry data used to generate mappings to telemetry data collected from these identified organizations. These rules may be configurable by an administrator, such as a member of an IT department, of the deploying organization to customize the deployment tool 220 for the organization.

The deployment tool 220 may compare mappings by identifying whether a mapping included in the first plurality of mappings includes the same (identical or matching) feature as a feature included in a mapping included in the second plurality of mappings. The deployment tool 220 may also identify mappings that refer to the same (identical or matching version) software application and have the same (identical or matching) profile. In some embodiments, the deployment tool 220 may be configured to allow some variance between mapping matches. For example, even if two mappings do not have identical profiles, if the profiles are similar (same operating system but different hardware), the deployment tool 220 may consider these mappings to "match." Again, various rules may be used to identify matches, which may be configurable by a user, automatically learned using various AI techniques, or a combination thereof.

When a feature included in the second plurality of mappings is also included in the first plurality of mappings (a "matching feature" is identified), the electronic processor 230 compares the level of deployment success associated with the feature included in the first plurality of mappings to a predetermined threshold (at block 314). The predetermined threshold may be a value selected by an administrator, a value automatically selected by the deployment tool 220, and the like. In some embodiments, the predetermined threshold may be the same for each feature used by the deploying organization. In other embodiments, the predetermined threshold may vary depending on the software application, the feature, or the type of feature.

When the level of deployment success associated with the matching feature does not satisfy the predetermined threshold, the deployment tool 220 adds the matching feature to a testing plan (at block 316). Alternatively, when the level of deployment success associated with the matching feature satisfies the predetermined threshold, the deployment tool 220 does not add the matching feature to the testing plan (at block 318). Similarly, in some embodiments, the software associated with the testing plan (or portions thereof) may be automatically deployed to one or more groups of users when the level of deployment success associated with the matching feature satisfies the predetermined threshold. The deployment tool 220 may not add a matching feature to a testing plan by excluding the matching feature from the plan or may include the feature in the plan and mark the matching feature as being adequately tested by other organizations or otherwise not needing further testing. As described above, the testing plan includes the features that should be tested when the first software application is deployed to the deploying organization.

In addition, as illustrated in FIG. 3, when a feature included in the second plurality of mappings is not included in the first plurality of mappings (a "non-matching feature" is identified), the deployment tool 220 adds the non-matching feature to the testing plan (block 320). Thus, these non-matching features are features that may be specific to the deploying organization and have not been tested by other organizations. Accordingly, the deployment tool 220 uses the comparison of the first plurality of mappings and the second plurality of mappings to determine what features should be tested by the deploying organization and what features may not need testing because the features have been adequately tested by other organizations.

As described above, in addition to listing features needing testing by the deploying organization, the testing plan may provide a testing template, an estimated time or cost associated with the testing, or a combination thereof. In some embodiments, the testing plan may also specify one or more pilot groups of computing devices of the deploying organization. A pilot group may include users (devices) identified by the collected telemetry organization for the deploying organization as likely not having issues with the deployment or likely having issues with the deployment to ensure software is properly validated during the deployment process.

After the testing plan is generated as described above, the testing plan is implemented as part of deploying the software application within the deploying application. Implementing the testing plan may include one or more manual or automatic tasks. For example, in some embodiments, an administrator may use the testing plan to initiate tests of various features with particular subset of the organization. Once initiated by an administrator, the deployment tool 220 may be configured to monitor the testing and provide testing results or notifications. In some embodiments, the deployment tool 220 may also be configured to automatically control when testing is started based on the results of other testing or other events or triggers.

In some embodiments, the testing plan may also allow an administrator to pick an interesting subset of the organization to test with. For example if there is a low confidence that a given software release will for particular types of users (for example, accountants and marketers) on particular hardware, the test plan may recommend individuals who should be included in the test to cover these areas. In particular, if there is a low confidence that a given software release will work for accountants or marketers on two different types of laptops, the test plan may recommend that one accountant on one laptop and one marketer on the other laptop test the software release.

As also described above, as the testing plan is implemented, the deployment tool 220 collects telemetry data from the computing devices of the deploying organization and calculates confidence levels, which may be used to control a rollout process and provide feedback to the deploying organization. Thus, the automatically generated testing plan and the monitoring providing by the deployment tool 220 saves time and system resources by using telemetry data collected from other organizations. Accordingly, an organization is better positioned to keep current on software updates and releases. As also described above, this feedback may also be used to improve the intelligence applied by the deployment tool 220 when creating deployment plans and recommendations for other organizations.

It should be understood that the functionality described herein as being performed by the deployment tool 220 may be performed using telemetry data collected from multiple organizations or telemetry data collected from a single organization. For example, as noted above, in some embodiments, a version of the telemetry data may be stored on a local data repository for an organization. Accordingly, the deployment tool 220 may be configured to use this local data repository when monitoring deployment process for an organization as described above. However, when the deployment tool 220 is creating the testing plan for an organization, the deployment tool 220 may access a collective, anonymized data repository that stores telemetry data for multiple organizations. Also, in some embodiments, the deployment tool 220 may be configured to create deployment plans as described above based solely on the telemetry data for the deploying organization. For example, the deployment tool 220 may determine likely usage of a new software application by the deploying organization based on historical usage of other software applications by the deploying organization to customize a deployment plan for the deploying organization in terms of what features should be tested. Similarly, in some embodiments, the deployment tool 220 may set confidence level thresholds for a software deployment based on levels of testing previously performed by the organization for other deployments to keep an organization from wasting resources on unnecessary testing. In other embodiments, an organization may choose to hold off deployment a particular upgrade and then only automatically deploy the upgrade when the average community score reaches a particular threshold.

Furthermore, in some embodiments, the anonymous data collected by the deployment insights service system 120 may be exposed to software developers to provide such developers with insights on which features are breaking and what the patterns are around the usage that lead to the feature breaking (for example, hardware configuration, organization profile, and the like). This data, which may be machine learned over a large data set over time provides a developer insight into the likelihood of a feature breaking as part of a version upgrade. This data also provides a sightline into issues as a new build is pushed out by organizations. For example, where issues are happening, the feedback loop is shortened and a software developer can take action much faster, such as by stopping a rollout or patching an offending problems in a subsequent build of the software.

For example, the functionality described herein may be provided as a single service owned by one organization, as a platform, or a combination thereof. When the functionality is provided as a platform, the deployment tool 220 can provide a registration interface that allows a software developer to specify an identifier of a software application (and optionally a version number), and a plurality of data points. In some embodiments, these data points include a number of core scenarios that the identified application supports. After telemetry data is collected for the identified application, one or more metrics can be determined for the application and exposed to the developer. These metrics can provide a level of deployment success, which may be one of a plurality of predetermined levels including, for example, "OK," "Crashed," "Hung," "Slow," "Recoverable Error," and the like. In some embodiments, the platform exposes a telemetry application programing interface (API) so that when a user uses the identified application, the application can directly call to the API and report the health of the application. In some implementations, the application may leverage other software on a device to report the application's health to the API. For example, application may be configured to report data to an error reporting service and the error reporting service may send data to the telemetry API. The data provided to the telemetry API may include environmental data, such as the hardware or browser used by the user, screen resolution, an operating system, or other software installed on the device executing the application.

Figure 4:
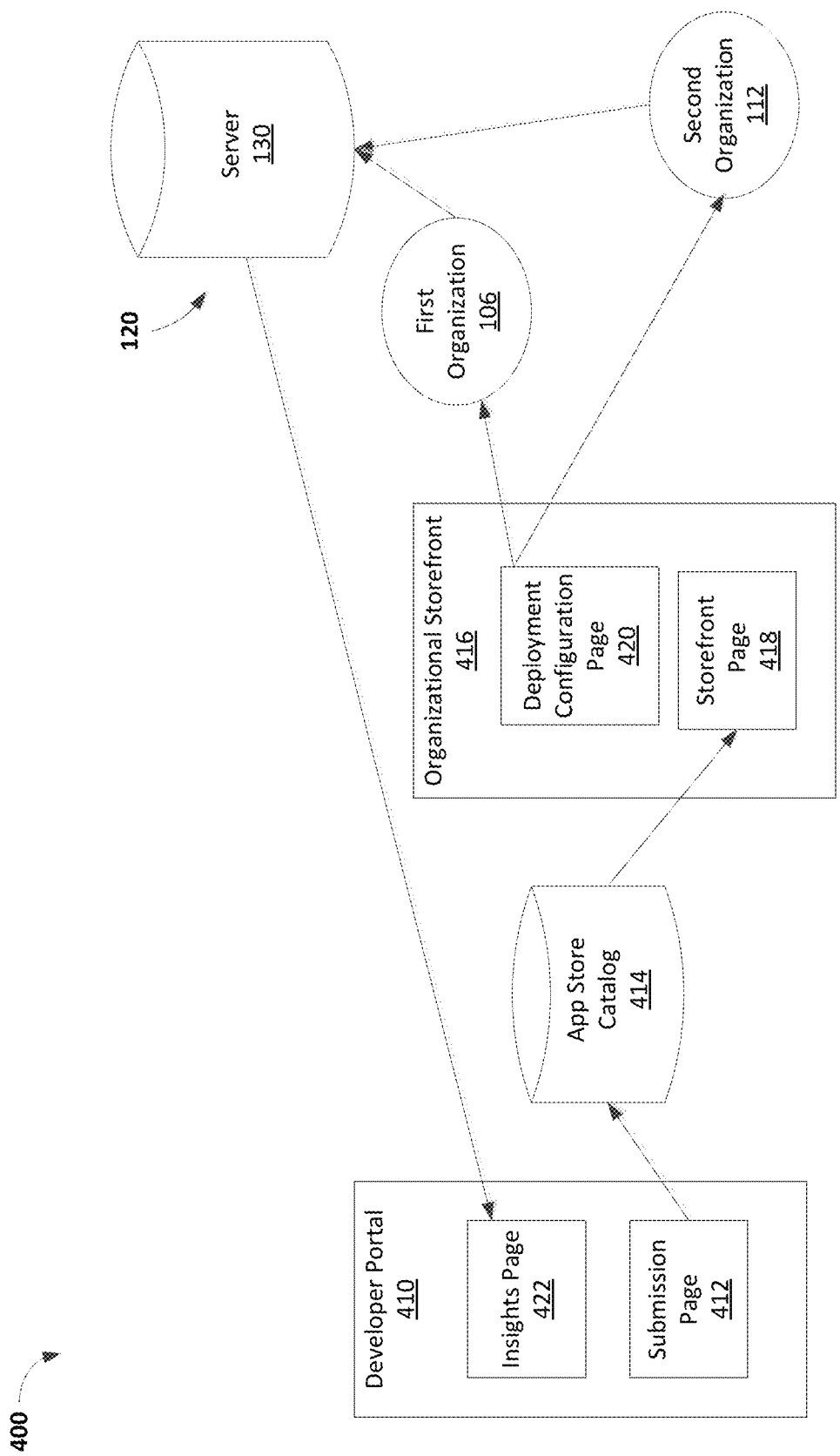
FIG. 4 schematically illustrates an environment for providing access to the deployment insights service system of FIG. 1 to software vendors according to some embodiments.

Data collected through the telemetry API may be aggregated as described above with respect to the method 300, and could be used to provide deployment plan recommendations as described above. Alternatively or in addition, the aggregated data may be exposed to software developers to see health statistics or metrics for particular environments (software, hardware, or both) and industries. For example, a software developer may be able to query the aggregated data to see a level of deployment success for particular features, particular device profiles, particular industries of the like based on telemetry data collected from multiple users, organizations, or a combination thereof. For example, FIG. 4 illustrates an environment 400 for providing access to the deployment insights service system 12 to software vendors. As illustrated in FIG. 4, software vendors can submit software applications through a developer portal 410 and, in particular, a submission page 412. Applications submitted through the portal 410 are made part of a store catalog 414, which can be accessed by organizations (IT administrators) through an organizational storefront 416, including, in particular, a storefront page 418 listing available software applications. The organizational storefront 416 may also include a deployment configuration page 420, which allows an organization provide information about the organization (industry, size, job titles, and the like) and, optionally, set parameters and thresholds for deploying a selected software application using the deployment insights service system 120 as described above.

Each application deployed through the organizational storefront 416 transmits telemetry data to the deployment insights service system 120 as described above. In some embodiments, each application provided through the organizational storefront 416 provides telemetry data in a common format to a common destination (the deployment insights service system 120). The data points collected via the telemetry data may include generic data points, such as how often was a given software vendor's application, add-in, service, or solution launched by users, how many minutes a user spent using the application, add-in, service, or solution, or the like. These interactions may be based on a single user action to launch the application, add-in, service, or solution or, for back-end workflow solutions, like a document archiving service, the interaction may not be based on user activity. Alternatively or in addition, the data points collected via the telemetry may include more detailed data points, such as opening documents, printing or sharing documents, creating or editing database records, marking support tickets as "resolved," or the like. Thus, the data points may, for any software vendor solution, provide one or more indicators regarding whether users are actually using the solution, how deeply they are using the solution, and how successful such use is.

For example, the software vendor's solution (managing support tickets in this example) may be configured to send back a data point of "ISVAPPLICATION=987 USERID=1 TIMEDATE=20190505-1345:40 USAGE-LEVEL=100 SCENARIO=1 DATA-LABEL=ResolveSupportTicket," which indicates that for the vendor's application, a given user at a given time took an action representing a deep level of usage (usage level of 100) because the user had resolved a support ticket. In another case, a separate user may have opened a support ticket and the solution may be configured to send back a data point of "ISVAPPLICATION=987 USERID=2 TIMEDATE=20190505-1142:40 USAGE-LEVEL=20 SCENARIO=1 DATA-LABEL=OpenSupportTicket." Similarly, when the second user uses the solution again later but at a surface level (view an existing ticket), the solution may be configured to send back a data point of "ISVAPPLICATION=987 USERID=2 TIMEDATE=20190506-1031:30 USAGE-LEVEL=60 SCENARIO=1 DATA-LABEL=TransferSupportTicket." It should be understood that a software vendor may be configured to define various scenarios when data points should be sent back.

Accordingly, not can organizations benefits from using the collected telemetry data to generate better testing plans, but (independent) software vendors can see the insights for their application's reliability. For example, the developer portal 410 may include an insights page 422 that a vendor can use to view metrics and statistics (including a development success level as described above) on a feature-by-feature basis.

Thus, embodiments described herein leverage telemetry data (hardware and software configuration data) collected across a multi-organization environment to develop a testing plan for deploying a software application to an organization. Accordingly, as compared to existing upgrade management tools, embodiments described herein provide a technical improvement by eliminating unnecessary testing from the upgrade process. As also described above, the collected and generated data can be provided through a user interface, such as a dashboard providing data in a real-time basis, that steps a user through the creation, management, and deployment of software products. The user interface may also provide crowdsourced health statistics of a particular software product, wherein the statistics may be tailored for the software product within a similar industry or computing environment (for example, software, hardware, or a combination) as the organization. Furthermore, the statistics may be tailored to specific scenarios or usage of a software product, wherein a user could select and access statistics for a subset of the scenarios that are important or relevant for the organization. Also as discussed above, similar statistics may be provided to software vendors or developers to provide insight into the industries and computing environments that a software product has been deployed in and how successful the product deployment has been.

Various features and advantages of some embodiments are set forth in the following claims.

What is claimed is:

1. A system for deploying software applications based on previous software deployments, the system comprising:
at least one electronic processor configured to
collect first telemetry data from a first plurality of devices, the first telemetry data including usage of a first plurality of features of a first software application by the first plurality of devices;
create, based on the first telemetry data, a first plurality of mappings, each of the first plurality of mappings representing a profile of one of the first plurality of devices, the first software application, and usage of one of the first plurality of features by the one of the first plurality of devices;
determine a level of deployment success for each of the first plurality of mappings; and
as part of deploying the first software application within an organization,
collect second telemetry data from a second plurality of devices associated with the organization, the second telemetry data including usage of a second plurality of features of a second software application by the second plurality of devices,
create, based on the second telemetry data, a second plurality of mappings, each of the second plurality of mappings representing a profile of one of the second plurality of devices, the second software application, and usage of one of the second plurality of features by the one of the second plurality of devices,
compare the first plurality of mappings and the second plurality of mappings to
identify a matching mapping included in the first plurality of mappings, wherein the matching mapping includes at least one of a profile, the first software application, and a usage matching at least one of a profile, the second software application, and a usage of a mapping included in the second plurality of mappings, and
determine whether to include a feature associated with the matching mapping in a testing plan for the organization relating to the first software application by comparing the level of deployment success for the matching mapping to a threshold associated with the organization, and implement the testing plan as part of deploying the
first software application within the organization.

2. The system of claim 1, wherein the at least one electronic processor is configured to determine whether to include the feature associated with the matching mapping in the testing plan by,
when the level of deployment success fails to satisfy the threshold, including the feature in the testing plan, and
when the level of deployment success satisfies the threshold, excluding the feature from the testing plan.

3. The system of claim 1, wherein the at least one electronic processor is further configured to, for each mapping included in the second plurality of mappings not associated with a matching mapping in the first plurality of mappings, include a feature associated with each mapping in the testing plan.

4. The system of claim 1, wherein the first software application is a first version of a software product and the second software application is a second version of the same software product.

5. The system of claim 1, wherein the first plurality of devices includes devices associated with a plurality of organizations.

6. The system of claim 5, wherein the plurality of organizations does not include the organization associated with the second plurality of devices.

7. The system of claim 1, wherein the first plurality of devices includes devices associated with a plurality of organizations with an organization parameter matching the organization.

8. The system of claim 7, wherein the organization parameter is at least one selected from a group consisting of an industry and a distribution of user types.

9. The system of claim 1, wherein the at least one electronic processor is further configured to provide the level of deployment success associated with at least one of the first plurality of mappings with a software developer associated with the first software application.

10. The system of claim 1, wherein the at least one electronic processor is configured to collect the first telemetry data from the first plurality of devices by receiving, from at least one of the first plurality of devices, telemetry data through an application programming interface exposed to the first software application as executed by the at least one of the first plurality of devices.

11. The system of claim 1, wherein the testing plan includes an estimation of workload for testing the set of features.

12. The system of claim 1, wherein the profile of one of the second plurality of devices includes software parameters and hardware parameters.

13. A method for deploying software applications based on previous software deployments, the method comprising:
collecting, with an electronic processor, first telemetry data from a first plurality of devices, the first telemetry data including usage of a first plurality of features of a first software application by the first plurality of devices;
creating, based on the first telemetry data, a first plurality of mappings, each of the first plurality of mappings representing a profile of one of the first plurality of devices, the first software application, and usage of one of the first plurality of features by the one of the first plurality of devices;
determining a level of deployment success for each of the first plurality of mappings; and as part of deploying the first software application within an organization,
collecting, with the electronic processor, second telemetry data from a second plurality of devices associated with the organization, the second telemetry data including usage of a second plurality of features of a second software application by the second plurality of devices,
creating, based on the second telemetry data, a second plurality of mappings, each of the second plurality of mappings representing a profile of one of the second plurality of devices, the second software application, and usage of one of the second plurality of features by the one of the second plurality of devices,
comparing the first plurality of mappings and the second plurality of mappings to identify a matching mapping included in the first plurality of mappings, wherein the matching mapping includes at least one of a profile, the first software application, and a usage matching at least one of a profile, the second software application, and a usage of a mapping included in the second plurality of mappings,
determining whether to include a feature associated with the matching mapping in a testing plan for the organization relating to the first software application by comparing the level of deployment success for the matching mapping to a threshold associated with the organization, and
implementing the testing plan as part of deploying the first software application within the organization.

14. The method of claim 13, wherein determining whether to include the feature associated with the matching mapping in the testing plan includes,
when the level of deployment success fails to satisfy the threshold, including the feature in the testing plan, and
when the level of deployment success satisfies the threshold, excluding the feature from the testing plan.

15. The method of claim 13, the method further comprising, for each mapping included in the second plurality of mappings not associated with a matching mapping in the first plurality of mappings, including a feature associated with each mapping in the testing plan.

16. The method of claim 13, wherein the first software application is a first version of a software product and the second software application is a second version of the same software product.

17. Non-transitory computer-readable medium storing instructions that, when executed with an electronic processor, perform a set of functions, the set of functions comprising:
collecting first telemetry data from a first plurality of devices, the first telemetry data including usage of a first plurality of features of a first software application by the first plurality of devices;
creating, based on the first telemetry data, a first plurality of mappings, each of the first plurality of mappings representing a profile of one of the first plurality of devices, the first software application, and usage of one of the first plurality of features by the one of the first plurality of devices; and
as part of deploying the first software application within an organization,
collecting second telemetry data from a second plurality of devices associated with the organization, the second telemetry data including usage of a second plurality of features of a second software application by the second plurality of devices, creating, based on the second telemetry data, a second plurality of mappings, each of the second plurality of mappings representing a profile of one of the second plurality of devices, the second software application, and usage of one of the second plurality of features by the one of the second plurality of devices, determining a level of deployment success for each of the first plurality of mappings, comparing the first plurality of mappings and the second plurality of mappings to identify a matching mapping included in the first plurality of mappings, wherein the matching mapping includes at least one of a profile, the first software application, and a usage matching at least one of a profile, the second software application, and a usage of a mapping included in the second plurality of mappings, determining whether to include a feature associated with the matching mapping in a testing plan for the organization relating to the first software application by comparing the level of deployment success for the matching mapping included in the first plurality of mappings to a threshold associated with the organization, wherein when the level of deployment success fails to satisfy the threshold, including the feature in the testing plan, when the level of deployment success satisfies the threshold, excluding the feature from the testing plan, and implementing the testing plan as part of deploying the first software application within the organization.

18. The non-transitory computer-readable medium of claim 17, the set of functions further comprising, for each mapping included in the second plurality of mappings not associated with a matching mapping in the first plurality of mappings, including a feature associated with each mapping in the testing plan.

19. The non-transitory computer-readable medium of claim 17, wherein the first plurality of devices includes devices associated with a plurality of organizations with an organization parameter matching the organization.

* * * * *